United States Patent [19]

Pacholok

[11] Patent Number: 5,196,780
[45] Date of Patent: Mar. 23, 1993

[54] NI-CAD BATTERY CHARGER CIRCUIT

[76] Inventor: David R. Pacholok, 1815 W. Higgins, Sleepy Hollow, Ill.

[21] Appl. No.: 757,237

[22] Filed: Sep. 10, 1991

[51] Int. Cl.$^5$ .............................................. H02J 7/04
[52] U.S. Cl. ........................................ 320/40; 320/32
[58] Field of Search ....................... 320/40, 20, 21, 32, 320/35, 36

[56] References Cited

U.S. PATENT DOCUMENTS

| | | | |
|---|---|---|---|
| 4,341,988 | 7/1982 | Small | 320/31 |
| 4,346,336 | 8/1982 | Crawford | 320/9 |
| 4,392,101 | 7/1983 | Saar et al. | 320/20 |
| 4,394,612 | 7/1983 | Emerle et al. | 320/31 |
| 4,395,672 | 7/1983 | Gassaway | 320/31 |
| 4,413,221 | 11/1983 | Benjamin et al. | 320/48 |
| 4,639,655 | 1/1987 | Westhaver et al. | 320/14 |
| 4,647,834 | 3/1987 | Castleman | 320/43 |
| 4,649,333 | 3/1987 | Moore | 320/31 |
| 4,670,703 | 6/1987 | Williams | 320/22 |
| 4,727,306 | 2/1988 | Misak et al. | 320/35 |
| 4,746,854 | 5/1988 | Baker et al. | 320/21 |
| 4,806,840 | 2/1989 | Alexander et al. | 320/20 |
| 4,820,965 | 4/1989 | Siemer | 320/31 |
| 4,843,299 | 6/1989 | Hutchings | 320/31 |
| 4,888,544 | 12/1989 | Terry et al. | 320/37 |
| 5,028,859 | 7/1991 | Johnson et al. | 320/15 |
| 5,057,762 | 10/1991 | Goedken et al. | 320/15 |

Primary Examiner—Steven L. Stephan
Assistant Examiner—Matthew Nguyen
Attorney, Agent, or Firm—Jones, Day, Reavis & Pogue

[57] ABSTRACT

An analog, low-cost nickel-cadmium battery charger including a fast charging current circuit and a slow charging current circuit, both of which are controlled by a comparator circuit which compares the characteristic negative change in battery voltage at the onset of overcharge to the stored charging voltage and changes the charging current from fast charging to slow charging when the battery voltage begins to decrease at the onset of overcharge, a timer that shuts off the fast charging current circuit after a predetermined period of time and reverts to the slow charging current circuit, and a thermostat that checks the temperature of the battery and, in the event of overheating or cooling below a predetermined temperature, stops all charging of the battery.

15 Claims, 2 Drawing Sheets

NI-CAD BATTERY CHARGER CIRCUIT

FIELD OF THE INVENTION

The present invention relates to battery chargers in general and specifically to a Ni-Cad battery charger circuit that uses the $-\Delta V$ characteristic of nickel-cadmium batteries in which the nickel-cadmium battery reaches a peak voltage and begins to decrease in voltage after it is fully charged.

BACKGROUND OF THE INVENTION

It is well-known in the art that nickel-cadmium batteries have a $-\Delta V$ characteristic during charging, where the battery reaches a peak voltage and then continues to decrease in voltage after it is fully charged.

Prior art battery chargers that have both fast and slow or trickle charge circuits use various methods for stopping the fast charge and initiating the slow charge. In some cases, a timer is used to shut off the fast charge after a predetermined period of time. However, in this case, the exact amount of time necessary to charge the battery depends upon its discharged state. Other devices utilize a voltage comparator and the battery voltage is compared with some preset value of voltage and at that point the fast charge is terminated and the slow charge is initiated. Other devices turn off the charging circuit when the battery reaches a predetermined charge voltage for a specific period of time.

The present invention allows a nickel-cadmium battery to be charged to its fully-charged voltage and at that point the fast charging circuit is disconnected and the slow charging circuit is connected to the battery. This battery charger utilizes the concept of the $-\Delta V$ characteristic of nickel-cadmium batteries. In this case, the nickel-cadmium battery reaches a peak voltage and begins to decrease in voltage after it is fully charged. The present invention detects the sudden decrease in voltage and disconnects the fast charging circuit and couples the slow or trickle charging circuit to the battery at that point. In addition, the circuit includes expiration of a preset time period for disconnecting the fast charging voltage circuit in the event the $-\Delta V$ circuit failed to operate, and also includes a thermostat which opens the fast charge circuit when it reaches 40° to 60° C. and connects the slow charge circuit to the battery.

Thus, with the present invention, a 13 microsecond charging pulse at 22 KHz provides five amps at the fast charging rate and 50-300 milliamps at the slow charging rate by reducing the frequency of the 13 microsecond pulse to about 1.5 KHz. The charging control is accomplished by the characteristic $-\Delta V$ of the ni-cad pack at the onset of overcharge, the expiration of the 18-minute timer, or the temperature of the battery as determined by the thermostat at 40°-60° C. The occurrence of any one of those events causes the nominal five amp fast charge rate to drop to the required 50-300 milliamp continuous charge rating of the four-, six- and ten-cell ni-cad battery packs.

Thus, it is an object of the present invention to provide a battery charger circuit that provides a fast charging rate of five amps utilizing 13 microsecond pulses at 22 KHz and a slow charging rate of 50-300 milliamp continuous charge rating of the ni-cad battery packs.

It is also an object of the present invention to utilize the characteristic $-\Delta V$ of the ni-cad pack at the onset of overcharge to disconnect the fast charging circuit and connect the slow charging circuit to the battery.

It is still another object of the present invention to use a timer to disconnect the fast charging circuit after a predetermined period of time and couple the slow charging circuit to the battery pack.

It is still another object of the present invention to utilize a thermostat to disconnect the fast charging circuit from the battery when the battery temperature reaches the range of 40°-60° C. and couple the slow charging circuit to the battery.

SUMMARY OF THE INVENTION

Thus, the present invention relates to a battery charger having a fast charging voltage circuit and a slow charging voltage circuit comprising means for coupling the fast charging circuit to a battery and to a resistance/capacitance time constant circuit; means for comparing the fast charging voltage coupled to the battery to the voltage stored by the capacitor; and means for removing the fast charging voltage circuit from and coupling the slow charging voltage circuit to the battery when the voltage stored by the capacitance exceeds the battery voltage.

The invention also relates to a method of charging a battery with a fast charging voltage circuit and a slow charging voltage circuit comprising the steps of coupling the fast charging voltage circuit to a battery and to a resistance/capacitance time constant circuit; comparing the fast charging voltage coupled to the battery to the voltage stored by the capacitance; and removing the fast charging voltage circuit from and coupling the slow charging voltage circuit to the battery when the voltage stored by the capacitance exceeds the battery voltage.

BRIEF DESCRIPTION OF THE DRAWINGS

These and other objects of the present invention will be more readily understood in conjunction with the following detailed description and the accompanying drawings in which like numerals represent like elements and in which.

DETAILED DESCRIPTION OF THE DRAWINGS

Figure 1:
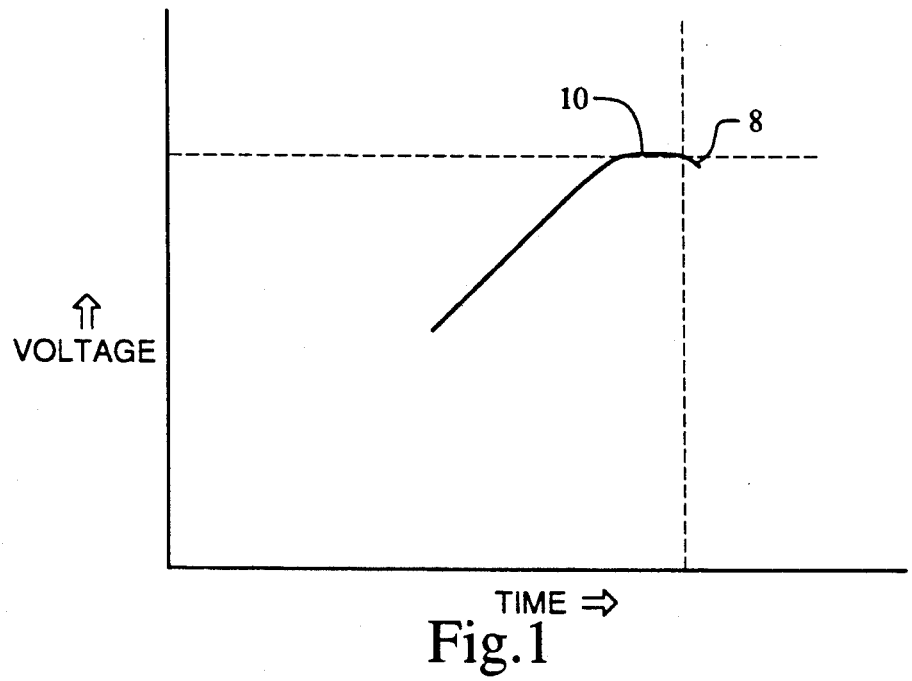
FIG. 1 is a partial graph of the voltage-time ratio for charging a nickel-cadmium battery and illustrating the decrease in voltage of the battery after it is fully charged and at the onset of overcharge.

The voltage/tim®graph for a nickel-cadmium battery is partially illustrated in FIG. 1. It will be noted that when the battery is fully charged, the curve is essentially flat where indicated by the numeral 10 and then begins a decrease in voltage as indicated by the numeral 8 if a charging current is continued to be applied to the battery. This decrease in battery voltage is known as the $-\Delta V$ characteristic of nickel-cadmium batteries. It is this characteristic that is utilized by the present invention to regulate the charging of nickel-cadmium batteries.

Figure 2:
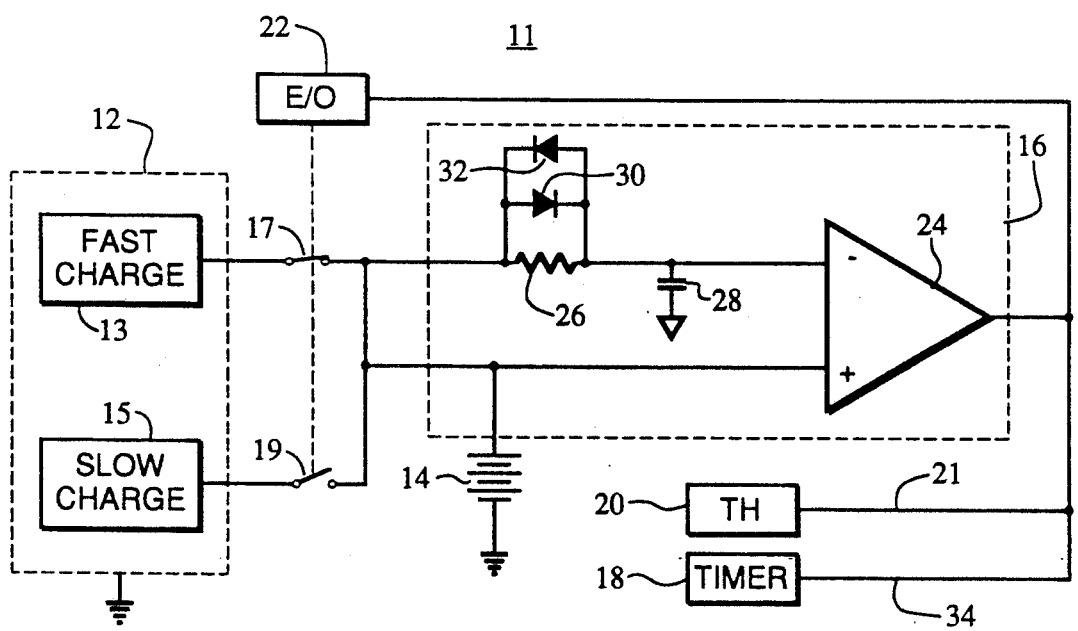
FIG. 2 is a simplified block diagram of the circuit of the present invention.

A diagrammatic block diagram of the present invention is illustrated in FIG. 2 and is designated generally by the numeral 11. The circuit 11 includes a charging current source 12 which includes a fast charging current circuit 13 and a slow charging current circuit 15 which are coupled through switches 17 and 19, respectively, to a nickel-cadmium battery 14. The fast and slow charging circuits 13 and 15 in the charging current source 12 are controlled by charging control subcircuit 16, timer 18 and thermostat 20. Each of the subcircuits 16, 18 and 20 drive an electro-optical device 22 which selectively connects and disconnects the fast charging circuit 13 and the slow charging circuit 15 to the battery 14.

It can be seen in FIG. 2 that the fast charging current circuit 13 is coupled through switch 17 to 30 one side of the battery 14 and to one terminal of comparator 24 in the $-\Delta V$ circuit 16. The charging current is also coupled through a resistor 26 and capacitor 28 to the other input terminal of comparator 24. Diode 30 in parallel with resistor 26 causes capacitor 28 to charge rapidly to within 0.6 volt of battery voltage when the fast charge is begun. This speeds the $-\Delta V$ circuit response if a fully-charged battery pack is inserted into the charger, thus allowing fast charge termination in one and one-half minutes typically. Diode 32 causes rapid discharge of capacitor 28 allowing packs to be inserted into the charger in quick succession without the need for a 100-second wait for the capacitor 28 to discharge through resistor 26. During fast charging, the voltage on capacitor 28 is lower than battery voltage because the battery voltage is slowly rising and the voltage on capacitor 28 is trying to "catch up". At the onset of overcharge, capacitor 28 has already charged to peak battery voltage and battery voltage is beginning to descend as shown in FIG. 1 at curve portion 8. This condition causes the output of comparator 24 to change from a "high" to a "low" state which varies current flow to electro-optical device 22 and opens switch 17 and closes switch 19, thus disconnecting the fast charging circuit 13 from the battery 14 and connecting the slow charging circuit 15 to the battery 14. The fast charging circuit 13 generates a five amp fast charge rate utilizing 13 microsecond pulses at 22 KHz as will be shown hereafter. The slow charging circuit 15 provides 300 milliamps continuous charge rating to the ni-cad battery 14.

In addition, a timer 18 is also initiated when the battery pack is inserted in the charger 11. After a predetermined period of time, such as 18 minutes, the timer generates an output on line 34 that is used to vary the current flow to electro-optical circuit 22 and again disconnect the fast charging circuit 13 from battery 14 and connect the slow charging circuit 15 to the battery 14.

Figure 3:
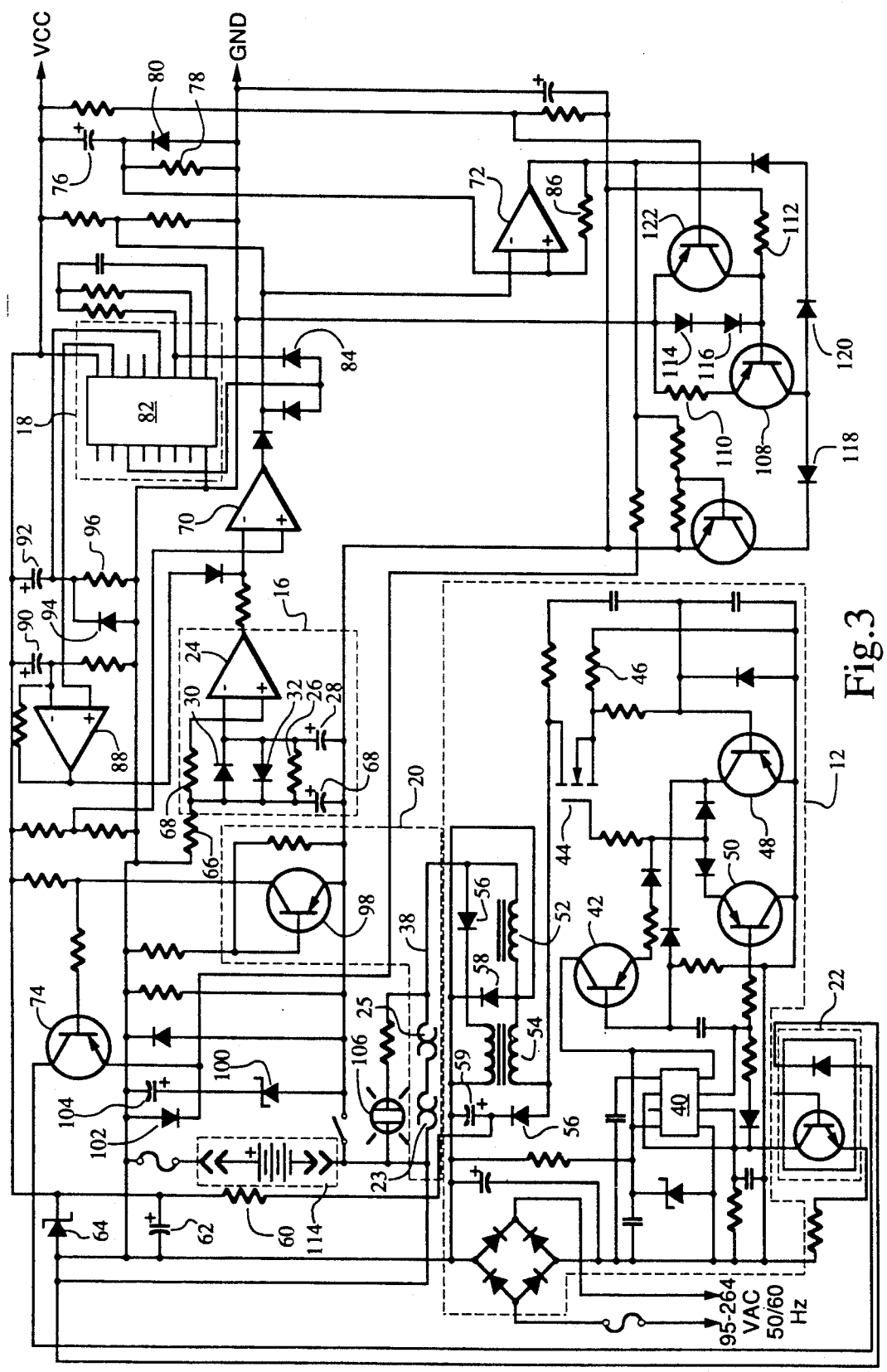
FIG. 3 is a detailed circuit diagram of the present invention.

Also, a thermostat 20 includes a high temperature thermostat 23 and a low temperature thermostat 25 (see FIG. 3). They check the temperature of the battery and, if the battery temperature is in the range of 40°-60° C., the high thermostat 23 will also generate a signal on line 21 to interrupt or vary current flow to the electro-optical device 22, again disconnecting the fast charging circuit 13 from the battery 14. The low temperature thermostat 25 opens below 0° C. to prevent charging when battery gas recombination is slow (below 0° C.). Therefore a safe operating window of approximately 0°-45° C. is established.

A detailed circuit of the novel battery charger is illustrated in FIG. 3. As can be seen in FIG. 3, the battery charging current source 12 couples the charging voltage to battery 14 on lines 36 and 38. The voltage on line 36 is also coupled to an electro-optical circuit 22 which causes the integrated circuit 40 to generate an output on line 3 of approximately 13 microsecond pulses at 22 KHz for the fast charge. That output is coupled through transistor 42 to the Insulated Gate Field Effect Transistor (IGFET) 44 which may be a commercially available type known as IRF 830. One of two conditions will cause IGFET 44 to TURN-OFF. The first is a base-to-emitter voltage drop across resistor 46, that turns off transistor 48 which turns off transistor 42 and removes the input to IGFET 44 causing IGFET 44 to turn off. The second way is the turn-off of transistor 50 by the expiration of the 13 microsecond charging pulse from circuit 40 which shuts IGFET 44 off. This limits the ON-time preventing IGFET 44 over dissipation at less than 90 volts AC line voltage.

This operation causes peak current regulation of IGFET 44 drain current which, in turn, sets the filter inductor 52 average current and therefore battery-charging current. Transformer 54 and diode 56 limit the IGFET 44 current rate of rise and maximum peak current during turn-on of IGFET 44 into a previously conducting diode 58. This reduces the switching losses of IGFET 44 and diode 58 improving reliability and lowering conducted and radiated EMI (electromagnetic induction).

The energy storage in transformer 54 and diode 56, capacitor 59, resistor 60, capacitor 62 and diode 64 provide a 6.2 volt auxiliary voltage supply needed for circuit components associated with the charging control circuit 16. The electro-optic circuit 22 is commercially available and known as 4N35. When "on", it establishes the fast charging current circuit 13 by providing approximately 13 microsecond pulses from integrated circuit 40 at 22 KHz on line 41. When turned "off", the electro-optic circuit 22 establishes the slow charging current circuit 15 by causing the charging pulses to be reduced to 1.5 KHz and thus the charging rate provided by the integrated circuit 40 is greatly reduced to 50-300 milliamps to provide a slow charge. Integrated circuit 40 may be an astable multivibrator of the commercially available type known as 555.

As stated earlier, charging control is accomplished by one of three factors. The first is the characteristic $-\Delta V$ of the ni-cad pack at the onset of overcharge. This is accomplished by the $-\Delta V$ circuit 16 and associated components. The second is the expiration of the timer 18 and the third is the opening of the battery thermostat 20 at 40°-60° C. temperature of the battery. The occurrence of one or more of the above events causes the nominal five amp fast charging rate to drop to the required 50-300 milliamp continuous charge rating of the four-, six-, and ten-cell ni-cad battery packs.

The characteristic $-\Delta V$ of the ni-cad pack at the onset of overcharge is detected by circuit 16. Raw battery voltage is filtered by resistor 66 and capacitor 67 to remove noise and ripple. The voltage is then applied to the non-inverting input of comparator 24 through resistor 68 directly. It is also applied to its inverting input by way of a 100-second time constant filter formed by resistor 26 and capacitor 28. During fast charging, the voltage across capacitor 28, or stored by capacitor 28, is lower than battery voltage because battery voltage is slowly rising and the voltage being stored in capacitor 28 is trying to "catch up". At the onset of overcharge, capacitor 28 has already charged to the peak battery voltage and battery voltage begins to descend, as illustrated in FIG. 1 at point 8 on the battery charge curve. This condition causes comparator 24 to change its output from a "high" to a "low" state. This causes the output of comparator 70 to go "high" and finally causes hysteresis latch comparator 72 to go, and stay, low which shuts off transistor 74 through line 75, thus terminating current flow to the electro-optic circuit 22. This causes integrated circuit 40 to reduce the charge rate to the desired 50-300 milliamp trickle or slow rate.

Diode 30 causes capacitor 28 to charge rapidly to within 0.6 volt of battery voltage when the fast charge is begun. This speeds the $-\Delta V$ circuit response if a fully-charged pack is inserted into the charger, thus allowing fast charge termination in 1.5 minutes typically. Diode 32 causes rapid discharge of capacitor C4 allowing battery packs to be inserted into the charger in quick succession without the need for a 100-second wait for capacitor 28 to discharge through resistor 26. When a battery pack is inserted in the charger, comparator 72 is automatically set to produce an output to cause the fast charge or "high" state through capacitor 76, resistor 78 and diode 80.

Thus in summary, as the battery is being charged, capacitor 28 attempts to "catch up" with the battery voltage. It does catch up with the battery voltage at the time the battery is fully charged. When the $-\Delta V$ characteristic of the nickel-cadmium battery causes the battery voltage to begin to decrease, capacitor 28 voltage becomes greater than the battery voltage, thus turning off the electro-optic device 22 and causing the circuit 12 to revert to the slow or trickle charge operation.

The timer circuit 18 includes an integrated digital timer circuit 82 of the commercially available type known as MC14060B which provides a back-up charge control in the event of the $-\Delta V$ circuit failure. This occurs when a count of 8192 is reached, thus pulling line 83 of integrated circuit 82 high, which resets comparator 72 to the "low" or slow charge state. Diode 84 terminates the clock in counter 82 at a count of 8192, thus causing line 83 of the counter 82 to remain "high" and forcing a "low" at the output of comparator 72 should a latch component fail, for instance a leaky capacitor 76, an open resistor 78 or open resistor 86.

The digital timer 18 also doubles as a means of inhibiting the $-\Delta V$ circuit for about 70 seconds following the start of rapid harge to prevent false $-\Delta V$ charge termination due to anomalous battery voltage-time characteristics in this region. Specifically, a count of 512 is extracted on line 85 of integrated circuit 82 and is used to reset latch or comparator 88 to a "low" state allowing the inverting output of comparator 70 to be driven low by the $-\Delta V$ circuit after a count of 512 is reached. Comparator 88 is set automatically by capacitor 90 at the moment of battery pack insertion. Simultaneously, capacitor 92, diode 94 and resistor 96 reset integrated circuit 82 to a count of 0, thus initializing both timer functions.

A thermostat control 20 bypasses the timer, the $-\Delta V$ and the latch circuitry for greater reliability. It includes a high temperature thermostat 23 and a low temperature thermostat 25 in series. When the high temperature thermostat 23 opens, all current from the battery charger ceases to flow through the battery 14, preventing the battery 14 from overheating. A neon pilot lamp 106 then illuminates because of its parallel connection to the now open thermostat. This neon indicator lamp 106 is ballasted by a series connected resistor and serves to warn the user that the battery is overheated. In this way, a hot battery pack, when inserted, will not be charged until it cools sufficiently to close the thermostat 23, at which time a normal fast charge will occur. Additionally, to prevent battery damage due to charging below 0° where battery gas recombination is slow, the low temperature thermostat 25 is added in series with the high temperature (45° C.) thermostat 23. Therefore a safe operating temperature window (0°-45° C.) is established.

A 22-volt Zener diode 100, diode 102 and capacitor 104 protect both the control circuit 16 and the battery pack 14 from excess voltage due to contact bounce during pack insertion and battery dry-out, although dry-out is expected to cause rapid rise of pack temperatures and consequent thermostat activated shut-down. In operation, pack voltages in excess of 22 volts will cause reduction of charge current to less than 80 milliamps by direct removal of the forward bias to the electro-optic unit 22.

The remaining components drive the three charging status indicator lamps. Thermostat open indicator lamp 106 is driven by transformer 54 and diode 56. Transistor 108 along with resistors 110 and 112 and diodes 114 and 116 provide a 10-milliamp constant current source for red and green LEDs 118 and 120, respectively, to provide consistent brightness regardless of the number of cells in the inserted battery pack. Transistor 122 disables the current source when 6.2 volts of auxiliary power is lost so all status indicator lamps remain dark when main power is interrupted.

Thus, there has been disclosed an analog, low cost ni-cad battery charger. The circuit includes a fast charging circuit and a slow or trickle charging circuit, both of which are controlled by three different circuits. The first is a comparator circuit which compares the characteristic negative change in battery voltage at the onset of overcharge to the charging voltage and changes the charging current from fast charging to slow charging when the decrease in battery voltage occurs at the onset of overcharge. The second includes a timer that shuts off the fast charging circuit after a predetermined period of time such as 18 minutes and reverts to the slow charging circuit. The third circuit includes a thermostat that checks the temperature of the battery and, in the event of overheating, stops the fast charging circuit and activates the slow charging circuit.

For the fast charge, the charging circuit supplies a 13 microsecond charging pulse at the rate of 22 KHz to provide a five amp charge rate. The slow charging circuit provides a 50-300 milliamp continuous charge at the rating of the ni-cad battery packs. The comparator circuit uses a capacitor and a resistor at one input to the comparator. The comparator senses when the ni-cad battery charge voltage versus time curve becomes negative, indicating the onset of overcharge. Battery voltage is supplied to the capacitor by way of the resistor. The comparator senses the voltage across the capacitor. If the battery's voltage is increasing with time, the battery voltage is always higher than that of the capacitor, thus producing a high output from the comparator. The RC time constant is chosen so that the capacitor nearly fully charges to the battery voltage during the relatively flat portion of the charge curve that occurs near full charge. Therefore, when the battery voltage rapidly descends at the onset of overcharge, the capacitor voltage is higher than the battery voltage and the comparator changes state producing a low output which is used in turn to terminate the fast charge rate.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A battery charger having a fast charging current circuit and a slow charging current circuit comprising:
   means for coupling the fast charging current circuit to a battery to provide a voltage developed across the battery and to a resistor/capacitor time constant circuit for storing a voltage in the capacitor of the time constant circuit such that the capacitor voltage tries to catch up with the battery voltage;
   means for comparing the instantaneous voltage developed across the battery in response to the fast charging current with the instantaneous voltage stored by the capacitor; and
   means for removing the fast charging current circuit from, and coupling the slow charging current circuit to, the battery when the voltage stored by the capacitor exceeds the battery voltage developed by the fast charging current.

2. A battery charger as in claim 1 further comprising a timer coupled to the fast charging current circuit and the slow charging current circuit for automatically removing the fast charging current from the battery and coupling the slow charging current to the battery after a predetermined time period.

3. A battery charger as in claim 2 further comprising:
   a thermostat coupled to the battery for detecting the temperature of the battery; and
   means coupling the thermostat to the fast and slow charging current circuits for removing the fast charging current circuit from and coupling the slow charging current circuit to the battery when the battery reaches a predetermined temperature.

4. A battery charger as in claim 1 wherein the fast charging current circuit supplies a 13 microsecond charging pulse at a rate of 22 KHz to provide a five amp charge.

5. A battery charger as in claim 1 wherein the slow charging circuit provides 50–300 milliamp continuous charge current at the rating of the battery being charged.

6. A battery charger as in claim 1 wherein the battery being charged is a nickel-cadmium battery.

7. A charging circuit for a battery having a charge voltage versus time curve that increases until a relatively flat portion then decreases at the onset of overcharge, the circuit comprising:
   a fast charging circuit coupled to the battery;
   a series coupled resistance and capacitance for receiving and storing the charging current;
   a comparator circuit having first and second inputs;
   conductor means coupling the voltage stored by the capacitance to the first comparator input;
   resistor means coupling the battery voltage to the second comparator input;
   said comparator circuit detecting a decrease in battery voltage at the onset of overcharge of the battery and generating an output signal when the voltage stored by the capacitor is greater than the battery voltage at the onset of overcharge;
   a slow charging current circuit; and
   electro-optic means coupled to the comparator circuit for receiving the comparator output signal, removing the fast charging current from the battery and coupling the slow charging current to the battery when the battery voltage decrease is detected.

8. A charging circuit as in claim 7 wherein said means for removing the fast charging current circuit from and coupling the slow charging current circuit to the battery comprises:
   control means for generating 13 microsecond pulses at 22 KHz to provide a five ampere fast charging current and generating pulses at 1.5 KHz to provide a 50–300 milliamp continuous slow charging current;
   an electro-optic circuit coupled to the control means and the comparator circuit such that in a first conducting state of said electro-optic circuit, said control means causes generation of the 13 microsecond pulses at 22 KHz to provide a five amps charging rate for a fast charge and in a second non-conducting state of said electro-optic circuit said control circuit causes generation of the pulses at 1.5 KHz to provide a 50–300 milliamp charging rate for a slow charge; and
   means coupling the output of the comparator circuit to the electro-optic circuit to cause the non-conducting state and disconnect the fast charging current circuit from and connect the slow charging current circuit to the battery when the comparator generates the output signal.

9. A charging circuit as in claim 7 further comprising circuit means for causing said capacitor to charge to within 0.6 volts of battery voltage at an increased rate over its normal charging rate when the fast charging current circuit is coupled to a fully-charged battery so as to speed the circuit response to the decrease of the battery voltage at the onset of overcharge and allow fast charge termination in substantially 1.5 minutes.

10. A charging circuit as in claim 9 wherein said capacitor charging means comprises:
   a charging resistor coupled in series with the capacitor; and
   a first diode coupled in parallel with the series coupled resistor to receive the charging current for the capacitor.

11. A charging circuit as in claim 7 further comprising diode means for causing said capacitor to bypass the charging resistor during discharge so as to increase the capacitor discharge rate thereby allowing successive batteries to be inserted in the charger in succession without the need for waiting for the capacitor to discharge through a long time constant because of the charging resistor.

12. A charging circuit as in claim 11 wherein the diode means for increasing the discharge rate of the capacitor is a second diode coupled in parallel with the charging resistor in opposite polarity to said first diode.

13. A method of charging a battery with a fast charging current circuit and a slow charging current circuit, the method comprising the steps of:
   coupling the fast charging current circuit to a battery to provide a voltage developed across the battery and to a resistor/capacitor time constant circuit for storing a voltage in the capacitor of the time constant circuit such that the capacitor voltage tries to catch up with the battery voltage;
   comparing the instantaneous battery voltage developed by the fast charging current with the instantaneous capacitor voltage developed by the fast charging current; and removing the fast charging current circuit from, and coupling the slow charging current circuit to, the battery when the voltage across the capacitor exceeds the battery voltage.

14. A method as in claim 13 further including the steps of:

supplying a 13 microsecond charging current pulse at the rate of 22 KHz to provide a five amp charge as the fast charging current; and reducing the 22 KHz charging current pulse frequency to 1.5 KHz to provide a 50-300 milliamp continuous charge at the rating of the battery being charged as the slow charging current.

15. A method as in claim 14 further including the step of charging a nickel-cadmium battery with the fast charging and slow charging current.

* * * * *